United States Patent [19]

Schut et al.

[11] Patent Number: 4,895,392

[45] Date of Patent: Jan. 23, 1990

[54] ADJUSTING DEVICE FOR THE SHOULDER STRAP HOLDING ELEMENT OF A SAFETY BELT

[75] Inventors: Paulus M. Schut; Hermanus M. I. Koot, both of Montfoort, Netherlands

[73] Assignee: Techniku B. V. Woerden, Netherlands

[21] Appl. No.: 184,616

[22] Filed: Apr. 21, 1988

[30] Foreign Application Priority Data

Apr. 23, 1987 [NL] Netherlands ............................ 8700961

[51] Int. Cl.$^4$ ............................................. B60R 22/20
[52] U.S. Cl. ...................................... 280/808; 280/801
[58] Field of Search ........................ 280/808, 801, 804; 297/483

[56] References Cited

U.S. PATENT DOCUMENTS

| 4,135,737 | 1/1979 | Scholz et al. | 280/808 |
| 4,159,848 | 7/1979 | Manz et al. | 280/804 |
| 4,453,741 | 6/1984 | Hipp et al. | 280/801 |
| 4,640,550 | 2/1987 | Hakånsson | 280/808 |

FOREIGN PATENT DOCUMENTS

| 2655995 | 6/1978 | Fed. Rep. of Germany | 297/483 |
| 2657819 | 6/1978 | Fed. Rep. of Germany | 297/483 |
| 3400214 | 6/1986 | Fed. Rep. of Germany | 280/808 |
| 1367248 | 9/1974 | United Kingdom | 297/483 |

Primary Examiner—David M. Mitchell
Assistant Examiner—Karin Tyson
Attorney, Agent, or Firm—Wenderoth, Lind & Ponack

[57] ABSTRACT

An adjusting device for the shoulder strap holding element of a safety belt includes a slide member movable in a rail section by a screw spindle driven by a motor. The slide member can be tilted relative to the rail section to be locked in the rail section in any position.

9 Claims, 4 Drawing Sheets

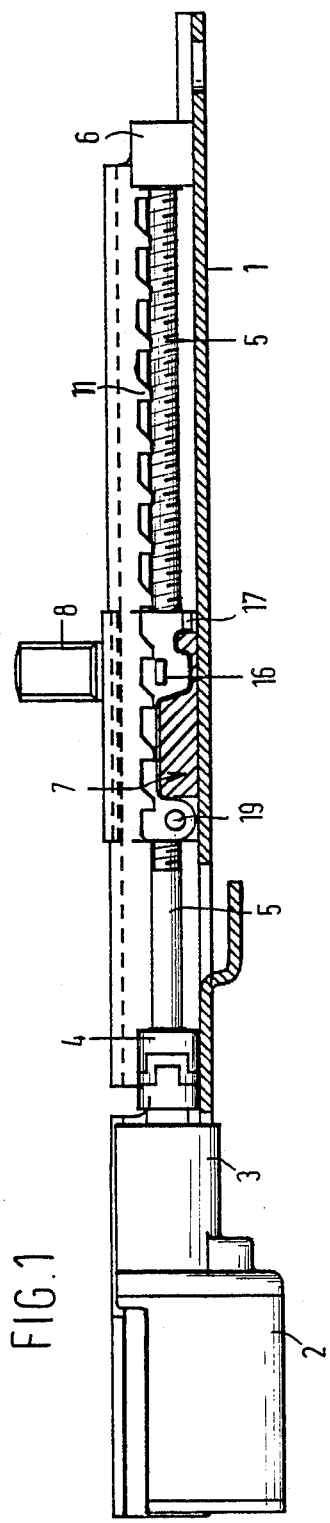
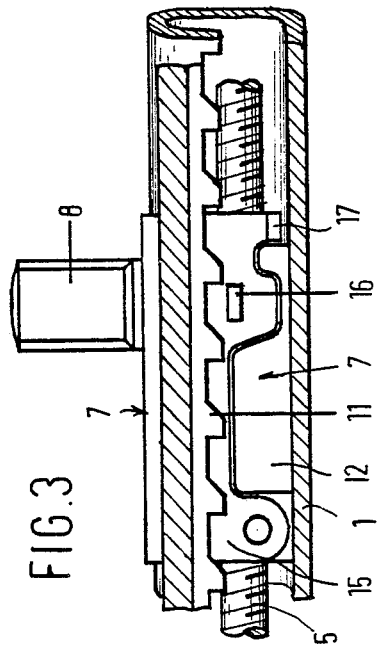
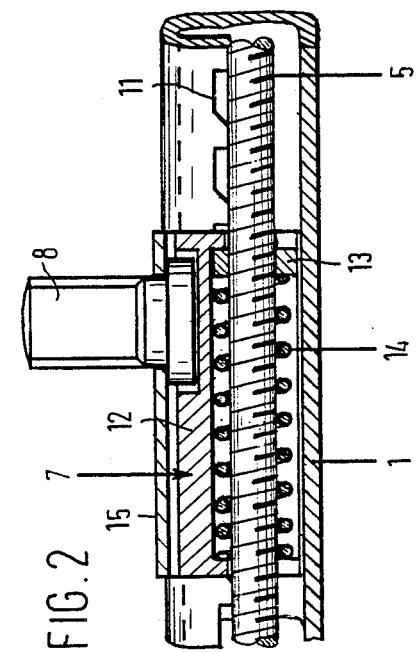

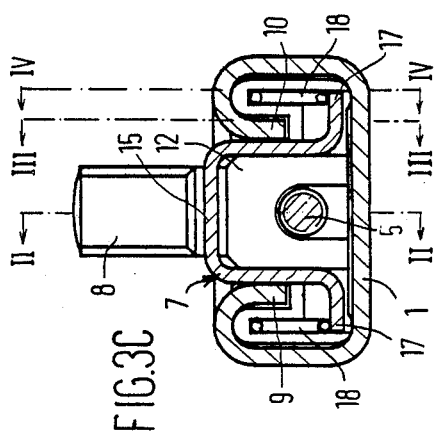
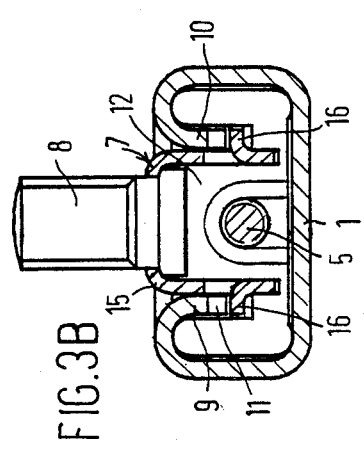
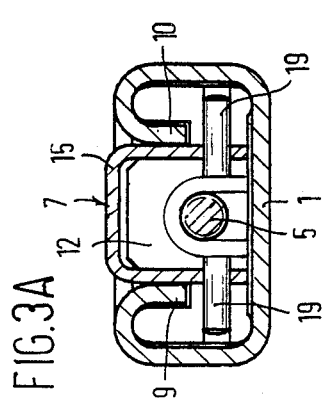
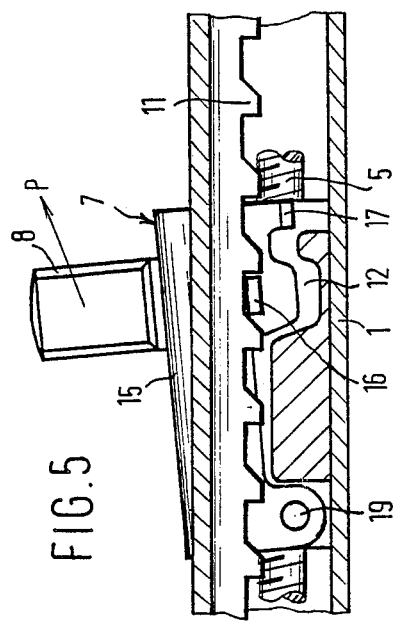
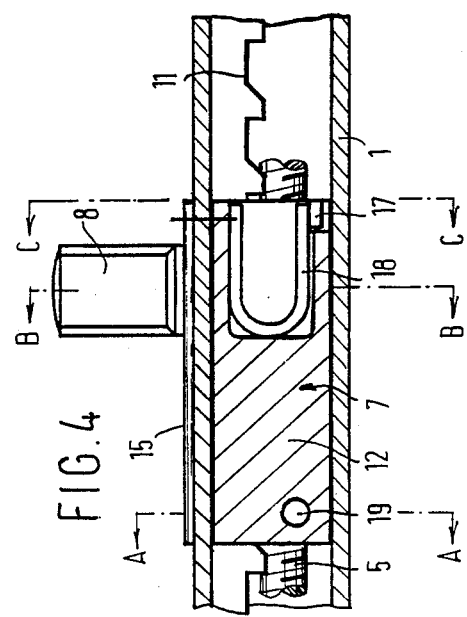

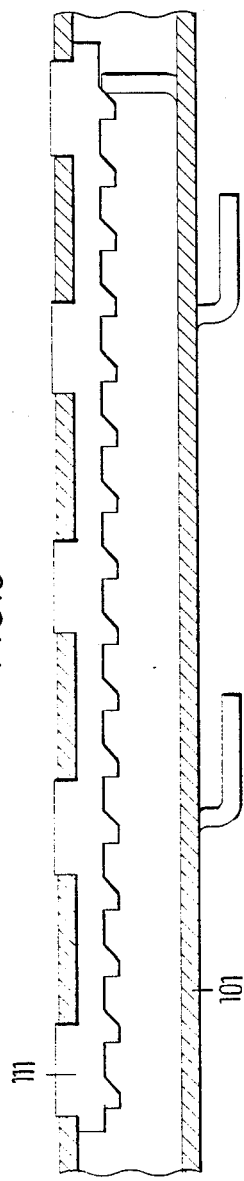
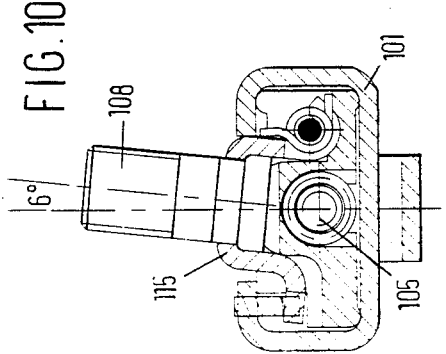
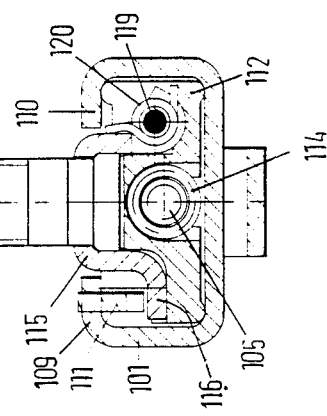

ADJUSTING DEVICE FOR THE SHOULDER STRAP HOLDING ELEMENT OF A SAFETY BELT

BACKGROUND OF THE INVENTION

This invention relates to an adjusting device for the shoulder strap holding element of a safety belt and includes a rail section and a slide member movable along the rail section and lockable with respect thereto in a number of positions.

In the vast majority of present-day automobiles means for attachment of shoulder strap holding elements of safety belts are provided at fixed points in the side pillars of the automobile. Each point of attachment is chosen so that it is most satisfactory for a driver of average stature. For tall persons the point of attachment is often too low and for small persons too high, so that the safety belt does not extend over the shoulder of the driver but adjacent the neck. This is not only hardly comfortable but even dangerous under certain circumstances.

In order to remove these drawbacks, some types of automobiles have already been provided with manually adjustable adjusting devices for the shoulder strap holding element of a safety belt such device including a rail section and a slide member movable along the rail section and lockable with respect thereto in a small number of positions. One locking position is suitable, e.g., for tall drivers, another for short drivers, and a central position being designed for the driver of average height. Thus a certain improvement over a fixed point of attachment for the shoulder strap holding element has already been effected. If one and the same vehicle is used by more than one driver, it is frequently necessary to manually adjust the point of attachment for the shoulder strap holding element. As a rule it is very difficult to operate the adjusting mechanism, because this is done by the driver from the sitting position by moving the knob of the adjusting mechanism with the right hand over the left shoulder. For the seat beside the driver the same operation has to be performed with the left hand over the right shoulder. In practice, this proves to be a very difficult operation, because not only must the slide member be unlocked, but subsequently a force must be exerted upwards or downwards on the adjusting knob of the adjusting mechanism. Because this operation is difficult, it is often omitted, so that under certain circumstances the safety belt will extend over the body even less comfortably and/or with even greater danger, e.g., because, with small drivers, the shoulder strap holding element is locked in a position for tall drivers, and conversely.

SUMMARY OF THE INVENTION

The object of this invention is to provide an adjusting device for the shoulder strap holding element of a safety belt which enables the point of attachment for the shoulder strap holding element to be electrically moved and locked in any desired position. The adjusting device may then be operated by means of a switch located within arm's reach on the central console or the door. Because the adjusting device must be accommodated in the side pillars of an automobile, the electric adjusting device must be of very compact construction, while the requirements to be imposed on mechanical strength must of course be satisfied.

According to this invention the adjusting device is characterized in that the slide member is movable in the rail section by means of a screw spindle driven by a motor, the slide member being rotatable with respect to the rail section and lockable in the rail section in any position. Preferably, the rail section is U-shaped in cross-section, with the legs of the U-shaped rail section being flanged inwardly through 90°, the edges of the flanged legs being spaced to form a slit, and a saw-toothed strip directed to the bottom of the rail section being provided in at least one of the flanged legs. There is formed a tubular guide for the slide member which may be rigid enough to receive the forces exerted thereon by the safety belt. The driven screw spindle then remains unloaded and only serves to move the slide member.

The slide member comprises two parts, namely, a guide block enclosed in the rail section and a U-shaped pivot member pivotally connected therewith, and to which the shoulder strap holding element is attached. The pivot member is provided with laterally projecting locking lips or tabs which, when the pivot member is pivoted, can engage between the teeth of the saw-toothed locking strip. The slide member can be spaced with respect to a drive nut of the drive spindle against the load of a pressure spring to ensure that the locking tabs can always engage between the recesses of the saw-toothed locking strip.

According to a first embodiment the pivot of the pivot member is directed transversely to the direction of movement of the slide member. This renders it possible to make the adjusting device symmetric relatively to the longitudinal axis and to flange the inwardly flanged legs of the rail section once more through 90°, with the saw-teeth being provided in both edges of the thus flanged legs. Because two toothed strips are present, the sheet material of the rail section may be made thinner.

The symmetric construction of the adjusting device has the further advantage that it can be mounted both in the left-hand and in the right-hand pillars of an automobile.

Under certain circumstances the force exerted by the safety belt on the pivot member can nearly parallel the pivot of the pivot member or at least make too small an angle with the pivot. In that case the pivot member will not pivot at the moment when this is necessary, and therefore, no locking will occur. These circumstances may present themselves in two-door automobiles in which the door pillar is placed far backwards and, furthermore, in automobiles of slender width in which the side of the front seat nearly abuts the door. Those cases are provided for by the second embodiment of the adjusting device according to this invention in which the pivot of the pivot member parallels the direction of movement of the slide member and is positioned at one side of the slide member, the locking tabs of the pivot member being located at the opposite side of the slide member.

BRIEF DESCRIPTION OF THE DRAWINGS

Some embodiments of the adjusting device according to this invention will be explained in more detail, by way of example, with reference to the accompanying drawings. In said drawings:

FIG. 1 is a side elevational view of a first embodiment of the adjusting device, shown partly in cross-section;

FIG. 2 is a cross-sectional view of the slide member of the adjusting device taken on the line II—II of FIG. 3C;

FIG. 3 is a cross-sectional view similar to FIG. 2, taken on the line III-III of FIG. 3C;

FIGS. 3A-3C are cross-sectional views of the slide member taken on lines A—A, B—B and C—C, respectively, of FIG. 4;

FIG. 4 is a cross-sectional view similar to FIG. 2 taken on the line IV—IV of FIG. 3C;

FIG. 5 is a cross-sectional view of the slide member similar to FIG. 3, but with a slide member being pivoted into a locked position;

FIG. 8 is a cross-sectional view taken on the line VIII—VIII of FIG. 6, but with omission of the parts belonging to the slide member;

FIG. 9 is a cross-sectional view taken on the line IX—IX of FIG. 7; and

FIG. 10 is a cross-sectional view similar to FIG. 9, but with the slide member pivoted into the locked position.

DETAILED DESCRIPTION OF THE INVENTION

Figure 6:
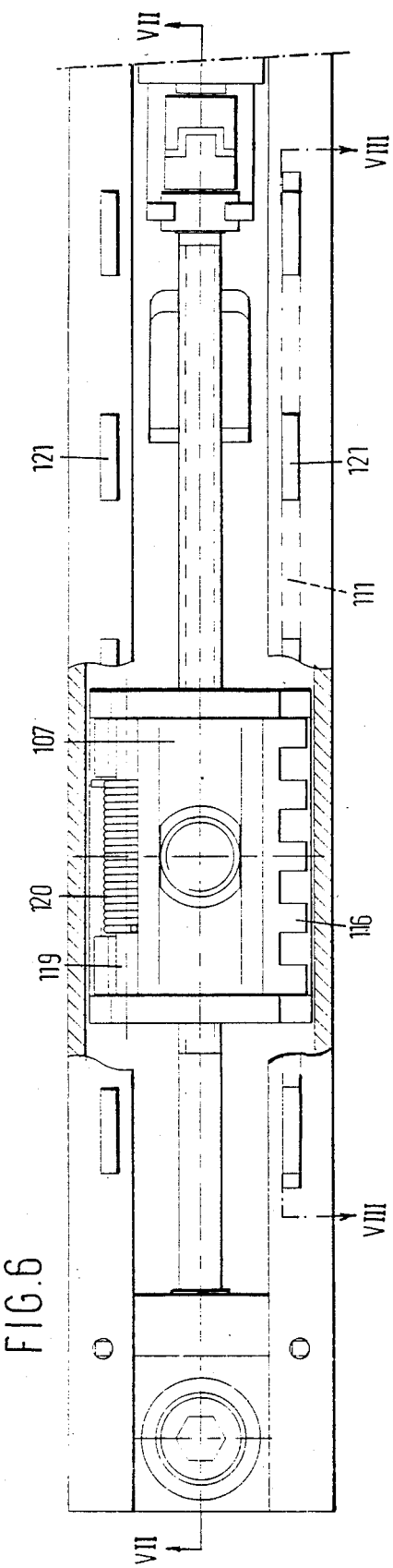
FIG. 6 is a top view of a second embodiment.
Figure 7:
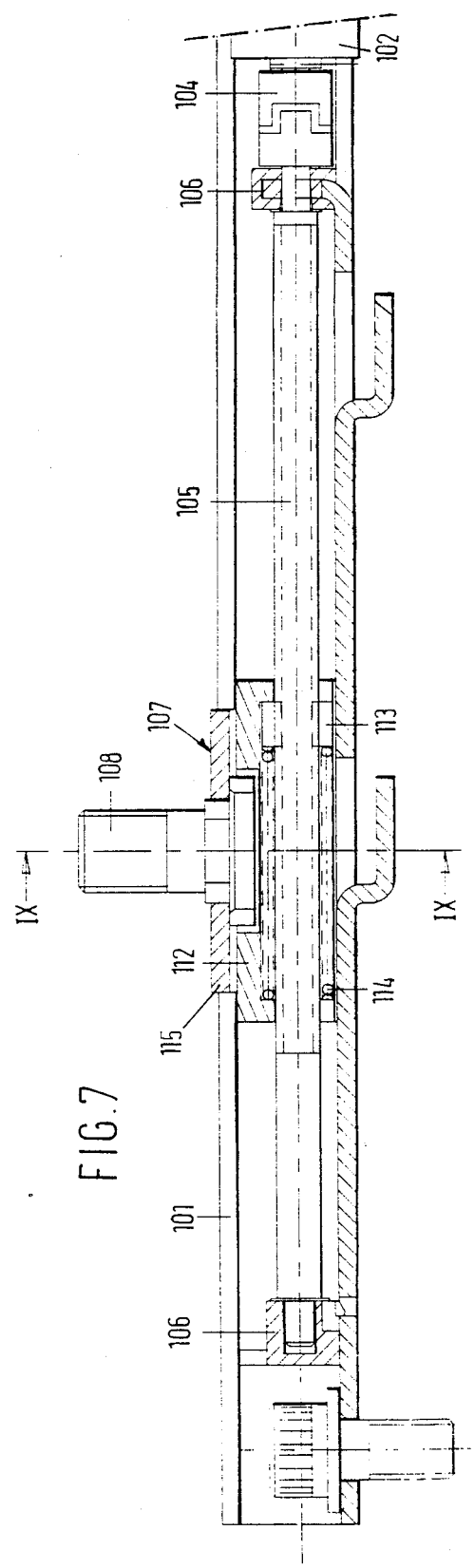
FIG. 7 is a cross-sectional view taken on the line VII—VII of FIG. 6.

The adjusting device as shown in FIG. 1 comprises a U-shaped rail section or member, the configuration of which will be described hereinafter. A motor 2 and a transmission 3 connected to the motor 2 are mounted on this rail section. The driving shaft of the transmission drives a screw spindle 5 by means of a flexible coupling 4, which screw spindle is arranged in the interior of the U-shaped rail section and is supported at the opposite end thereof by an end bearing 6. The screw spindle 5 can move a slide member 7 within the U-shaped rail section 1, which slide member 7 is provided with a projecting bolt 8, to which a shoulder strap holding element can be attached.

The shape of the U-shaped rail section 1 and the shape of the slide member 7 are shown in FIGS. 2-5. As appears from FIGS. 3A-3C, the legs of the U-shaped rail section 1 are flanged inwardly through 180°. The lower edges of the flanged legs 9,10 extend approximately to mid-height of the U-shaped rail section 1. The free edges of each of the flanged legs 9,10 are provided with a saw-toothed profile 11 and the slide member 7 can be locked in any recess between two teeth of the saw-toothed profiles 11 in a manner to be discussed later.

The slide member 7 comprises chiefly two main parts, namely, a guide block 12 which can be reciprocated within the rail section 1 and a U-shaped pivot member 15 pivotally connected with guide block 12, which U-shaped pivot member 15 is positioned between the facing walls of the flanged legs 9,10. The member 15 is provided in the guide block 12 and has downwardly directed legs. The side walls of the member 15 are laterally provided with locking lips or tabs 16 projecting outwardly into the plane containing the flanged legs 9,10 of rail section 1. In the non-tilted position of the member 15 locking tabs 16 can move under the saw-teeth 11 of the flanged legs 9,10. When member 15 is pivoted with respect to the guide block 12, locking tabs 16 can engage the recesses of the saw-teeth so as to lock the slide member 7 in position. The bolt 8 designed for attachment of the shoulder strap holding element forms part of the member 15, or is connected thereto or incorporated therein.

The shape of guide block 12 in cross-section is accommodated to the cross-sectional shape of rail section 1. Side parts of guide block 12 are slidable within the spaces confined by the flanged legs 9,10 of rail section 1. In the guide block 12 a leaf spring 18 is provided below each of flanged legs 9,10, which leaf springs press on respective outwardly extending projections 17 arranged at one end of the member 15. Both extending projections 17 extend laterally beyond the flanged edges 9,10 of rail section 1. A horizontal pivot pin 19 is provided at the opposite end of member and member 15 can pivot about pin 19 with respect to guide block 12 and also with respect to rail section 1, if a force P is exerted on the bolt 8 connected with the member 15 in a direction as shown in FIG. 5.

A nut 13 enclosing the screw spindle 5 is arranged within the guide block 12 to move the slide member 7 along the rail 1. At one side the nut 13 abuts an end wall of guide block 12, and against the other side of the nut 13 acts a pressure spring 14, which is supported by the other end wall of guide block 12. The function of this pressure spring will be explained hereinbelow.

The motor 2 is energized for normal movements of the slide member 7 along the rail, whereby the screw spindle 5 is driven in the direction of rotation and the nut 13 will be moved within the guide block 12 to the right or to the left, depending on the direction of rotation of the motor 2. The member 15 is then maintained in the 'normal' position owing to the outwardly projecting lips 17 being held down by leaf springs 18 provided in the guide block 12. When a force P is intermittently exerted on the shoulder strap holding element and therefore on the bolt 8 in a direction as shown in FIG. 5, the member 15 is turned about the pivot pin 19. When the locking tabs 16 are present between two teeth of respective of the saw-toothed sections 11, the slide member 7 is immediately locked in that position, thus preventing further movement thereof relative to rail 1. When the locking tabs 16 are positioned exactly opposite teeth of the saw-toothed sections 11, the member 15 cannot be turned about the pivot pin 19, so that the slide member will not be locked. In that case the presence of pressure spring 14 within the guide block 12 enables the slide member 7 to be drawn, against the force of the pressure spring, sufficiently far substantially in the direction of force P, so that the locking tabs can come to rest in the next recesses of the saw teeth, in which position the slide member 7 is locked. The pressure spring 14 bridges a maximum distance of 8.5 mm, which distance is large enough to ensure that the locking tabs 16 can always engage respective recesses of the saw teeth 11.

The transport of the slide member and consequently the movement of the shoulder strap holding element to an optimum position only require frictional forces to be overcome, so that a screw spindle small in diameter will be sufficient. The frictional forces to be overcome are the friction between the guide block 12 and rail section 1, the friction between the screw spindle 5 and the nut 13, the friction in the end bearing 6, the friction of the coiling mechanism of the safety belt and the friction on the shoulder strap holding element of the safety belt. The slide member 7 is locked as soon as the forces exerted on the member 15 are greater than those of the springs 14 and 18. The rail section 1 only needs to receive the forces exerted thereon through the slide member 7 in the locked position. The transport spindle 5 then remains unloaded, so that it may have a small diameter. The driving motor 2 may also be smaller, which has favourable effects on the sound level of the adjusting device.

The second embodiment as represented by FIGS. 6–10 shows essential similarities to the first embodiment as represented by FIGS. 1–5. For the sake of clarity, the same reference numerals are used in FIGS. 6–10 for corresponding parts as in FIGS. 1–5, but augmented by 100. The differences between the two embodiments will be explained hereinafter.

The legs 109,110 of rail section 101 are flanged inwardly through 90°, the edges of flanged legs 109,110 being spaced to form a slit, in which the U-shaped pivot member 15 of slide member 107 is movable in the longitudinal direction of rail section 101. The flanged edges of legs 109,110 are provided with regularly spaced rectangular openings 121 for receiving a saw-toothed strip 111. Unlike the embodiment of FIGS. 1–5, this embodiment comprises only one toothed strip 111 which is provided at a position in rail section 101 located opposite a pivot pin 119 of the U-shaped member 115.

The pin 119 of section 107 parallels the axis of spindle 105 and is provided in the guide block 112 of slide member 107. A torsion spring 120 is arranged about the pin 119 to ensure that the U-shaped member 115 is maintained in the non-tilted position during movement of the slide member 107. When forces are suddenly exerted on the safety belt attached to the bolt 108, the U-shaped member 115 turns about the pivot pin 119, and locking tabs 116 engage between the teeth of the toothed strip 111 in order to lock the slide member in that position, as shown in FIG. 10. The spring 114 ensures that the slide member 107 can move over a small distance with respect to the drive nut 113, when upon pivoting movement of the U-shaped member 115 its locking tabs 116 initially contact the bottom of the teeth of the toothed strip 111, in the same way as occurs with the embodiment of FIGS. 1–5.

It will be clear that the adjusting device must be mounted in such a manner that the U-shaped member 115 can turn about the pivot pin 119, i.e. that pivot pin 119 must be closer to the driver than the axis of the drive spindle 105. When the adjusting device is to be mounted in the right-hand side pillar of a vehicle, the slide member 107 must therefore be arranged in the rail 101 in a position rotated through 180°, and, of course, the toothed strip 111 must be arranged in the bent leg 110 instead of in leg 109, as shown in FIGS. 6, 9 and 10.

As is known per se for mirror adjusting devices, an embodiment with preprogrammed preferred positions for, e.g., three different drivers of the same vehicle is also possible with a safety belt adjusting device. The interior of the rail section 1, 101 can be provided with a linear position transducer which is in contact with a tapping point provided on the slide member 7, 107, The desired position of the slide member can be entered into a control unit by means of an appropriate circuit, after which the motor 2, 102 is energized until the desired position as been reached.

We claim:

1. An adjusting device for the shoulder strap holding element of a safety belt, said device comprising:
   a rail section having a U-shaped cross section including legs flanged inwardly, at least one of said flanged legs having a saw-toothed section;
   a slide member movable along said rail section to an infinite number of positions therealong, said slide member including a guide block positioned within said rail section and guided by said flanged legs for movement along said rail section, said guide block enclosing therein a nut;
   a motor driven screw spindle engaging said nut for moving said nut and thereby said slide member along said rail section to any of said infinite number of positions; and
   said slide member including means, responsive to a pulling force being exerted on a safety belt, movable, at any of said infinite number of positions of said slide member relative to said rail section, between an unlocked position, whereat said slide member is movable by said spindle along said rail section, to a locked position, whereat movement of said slide member along said rail section is prevented.

2. A device as claimed in claim 1, wherein said saw-toothed section is directed toward the bottom of said rail section.

3. A device as claimed in claim 1, wherein said means of said slide member comprises a U-shaped pivot member connected to said guide block so as to be pivotable about a pivot between said locked and unlocked positions, said pivot member being arranged within said flanged legs of said rail section and being provided with a bolt projecting outside said rail section for attachment to a shoulder strap holding element.

4. A device as claimed in claim 3, wherein said pivot member is provided with laterally outwardly projecting locking tabs situated, in said unlocked position of said pivot member beneath and in the plane of said saw-toothed section, and engaging between teeth of said saw-toothed section when said pivot member is pivoted to said locked position.

5. A device as claimed in claim 4, further comprising a pressure spring provided around said screw spindle within said guide block, said pressure spring abutting said nut and bearing on said guide block, said pressure spring permitting movement of said guide block relative to said rail section when a force is exerted on said bolt and when said locking tabs are aligned with teeth of said saw-toothed section, thereby permitting said pivot member to pivot into said locked position.

6. A device as claimed in claim 4, wherein said legs of said rail section are flanged inwardly through 180° such that edges of both said flanged legs end at the mid-height of said rail section and both said legs are provided with said saw-toothed sections.

7. A device as claimed in claim 6, wherein said pivot is directed transversely to the direction of movement of said slide member, said pivot member is provided, at an end thereof spaced from said pivot, with projections extending outwardly beneath and laterally beyond said edges of said flanged legs, and further comprising leaf springs provided in said guide block and pressing said projections in the direction of the bottom of said rail section to urge said pivot member to said unlocked position.

8. A device as claimed in claim 4, wherein said pivot extends parallel to the direction of movement of said slide member and is arranged within said slide member at one side thereof, with said locking tabs being located at an opposite side thereof.

9. A device as claimed in claim 8, further comprising a torsion spring provided around said pivot to urge said pivot member to said unlocked position.

* * * * *